United States Patent
Vihtari et al.

(10) Patent No.: US 8,473,546 B2
(45) Date of Patent: *Jun. 25, 2013

(54) MINIMIZING PCC RULE INSTANTIATION LATENCY

(75) Inventors: Mike Vihtari, Kanata (CA); Ajay Kirit Pandya, Ottawa (CA); Hani Salman, Ottawa (CA)

(73) Assignee: Alcatel Lucent, Paris (FR)

( * ) Notice: Subject to any disclaimer, the term of this patent is extended or adjusted under 35 U.S.C. 154(b) by 428 days.

This patent is subject to a terminal disclaimer.

(21) Appl. No.: 12/789,881

(22) Filed: May 28, 2010

(65) Prior Publication Data

US 2011/0295935 A1    Dec. 1, 2011

(51) Int. Cl.
    *G06F 15/16*     (2006.01)
    *G06F 17/00*     (2006.01)
    *H04W 36/00*     (2009.01)

(52) U.S. Cl.
    USPC ............................... 709/203; 726/1; 455/436

(58) Field of Classification Search
    USPC ................................ 709/203; 455/436; 726/1
    See application file for complete search history.

(56) References Cited

U.S. PATENT DOCUMENTS

| | | | |
|---|---|---|---|
| 2010/0180319 A1* | 7/2010 | Hu et al. | 726/1 |
| 2011/0022722 A1* | 1/2011 | Castellanos Zamora et al. | 709/235 |
| 2011/0202491 A1* | 8/2011 | Pandya et al. | 706/47 |
| 2011/0246586 A1* | 10/2011 | Steele | 709/206 |
| 2012/0026979 A1* | 2/2012 | Rommer et al. | 370/331 |

* cited by examiner

*Primary Examiner* — Jeong S Park
(74) *Attorney, Agent, or Firm* — Kramer & Amado P.C.

(57) ABSTRACT

Various exemplary embodiments relate to a method, policy and charging rules node (PCRN) and machine-readable storage medium for creating policy and control charging rules with minimal rule instantiation latency. Embodiments may include one or more of the following: receiving at a PCRN from an application node a first service request message, determining whether the PCRN should wait for a mate message for the service flow, if the PCRN should not wait for a mate message, immediately generating at least one PCC rule, and immediately pushing the first PCC rule to at least one gateway. Various exemplary embodiments may further include using subscriber preferences and/or a record of previous decisions to determine whether the PCRN should wait for a mage message. In various embodiments, the PCRN may disable a timer when it determines it should not wait for a mate message.

21 Claims, 5 Drawing Sheets

| APPLICATION ID | SUBSCRIBER | PCC RULE | SERVICE FLOW ID | CREATION METHOD |
|---|---|---|---|---|
| 0x3386B | 100000000000001 | 0xA782 | 0x8382 | PUSH |
| 0x7903 | 100000000000002 | 0x8267 | 0xA391 | PULL |
| | | | | |
| | | | | |

MINIMIZING PCC RULE INSTANTIATION LATENCY

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on PCC rule generation by the PCRF when receiving messages from at least two different sources, such as, for example, the application node (AN) and the PCEF. These specifications suggest the use of a timer when the first message is received, wherein the timer triggers the PCRF to set a period to expect receipt of a second message before generating a PCC rule. When the PCRF receives the second message before the timer expires, the PCRF generates the PCC rule using information included in both the first and second received messages.

The 3GPP standards, however, introduce latency into the system through the use of the timer. Once a timer has been started, the PCRF must wait for either a message from the UE or wait for the timer to expire before pushing a PCC rule. If the PCRF must wait for the timer to expire before taking action, users may become upset at the delay. Moreover, the timer consumes system resources and may slow down processing of other requests.

In view of the foregoing, it would be desirable to provide a method for reducing latency in generating PCC rules. In particular, it would be desirable to reduce latency caused by the PCRF waiting for the timer.

SUMMARY

In light of the present need for a method for reducing latency in generating PCC rules, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy and Charging Rules Node (PCRN) for processing a first service request message from an application node to generate at least one Policy and Charging Control (PCC) rule. The method may include: receiving at the PCRN from an application node the first service request message requesting a service flow for a subscriber; determining whether the PCRN should wait for a mate message for the service flow; if the PCRN should not wait for a mate message, immediately generating at least one PCC rule based at least on the information received in at least the first service request message received by the PCRN, and immediately pushing the first PCC rule to at least one gateway; and if the PCRN should wait for a mate message, starting a timer to begin a period for the PCRN to receive a second message from a second device before generating a first PCC rule, the second message being a mate of the first message, and generating at least one PCC rule based on the information received in at least one of the first service request message and the second message. Various exemplary embodiments relate to the above method encoded on a machine-readable medium as instructions for a PCRN to process a first service request message from an application node to generate at least one Policy and Charging Control (PCC) rule.

Various exemplary embodiments relate to a PCRN for processing at least a first request message to generate at least one Policy and Charging Control (PCC) rule. The PCRN may include: an Rx interface that receives a first request message from an application node; a service flow analyzer that generates at least one service flow from the first request message; a second interface that may receive a second request message from a gateway, the second request message being a mate to the first request message and containing flow information complementary to the at least one service flow; a mate checker that determines whether the PCRN is likely to receive the second request message when the PCRN receives the first request message; a tinier that begins a period to receive the second message if the mate checker determines that the PCRN will receive the second request message; and a rule generator that creates the at least one PCC rule for the service flow using at least one of the first and second messages.

It should be apparent that, in this manner, various exemplary embodiments reduce latency in generating PCC rules by determining whether the PCRN will receive a second request message. Particularly, by disabling or bypassing the timer when the PCRN will not receive a second request message, the PCRN is able to immediately generate PCC rules without waiting for the timer to expire.

BRIEF DESCRIPTION OF THE DRAWINGS

In order to better understand various exemplary embodiments, reference is made to the accompanying drawings, wherein.

DETAILED DESCRIPTION

Figure 1:
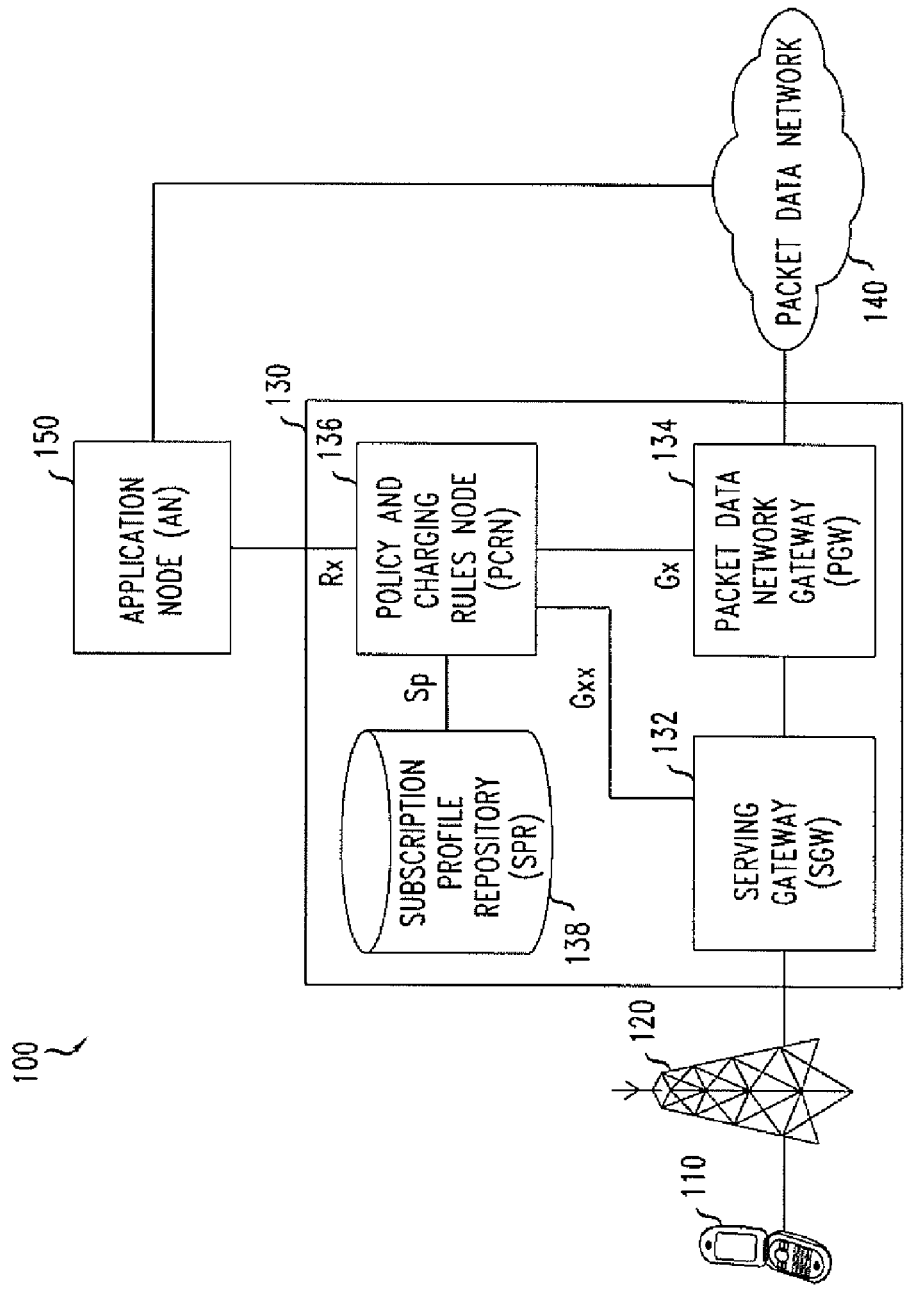
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment (UE) 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request. When the PCRN 136 receives a request from AN 150, PCRN 136 may use a timer to wait for a period of time to receive a mate message before generating a PCC rule. PCRN 136 may determine from various contextual information whether it is likely to receive a mate message based on information stored at PCRN 136 and/or SPR 138. If PCRN 136 determines that it is unlikely to receive a mate message, PCRN 136 may bypass or disable the timer.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences. Subscriber service preferences may include an indication of whether the subscriber allows various types of service requests. Subscriber service preferences may also include an indication of whether PCRN 136 may decrease latency by disabling a mate message timer. An operator may control various elements of a subscriber profile via a web-portal based GUI. The GUI may present a subscriber's configuration form which may allow an operator to change subscriber service preferences.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
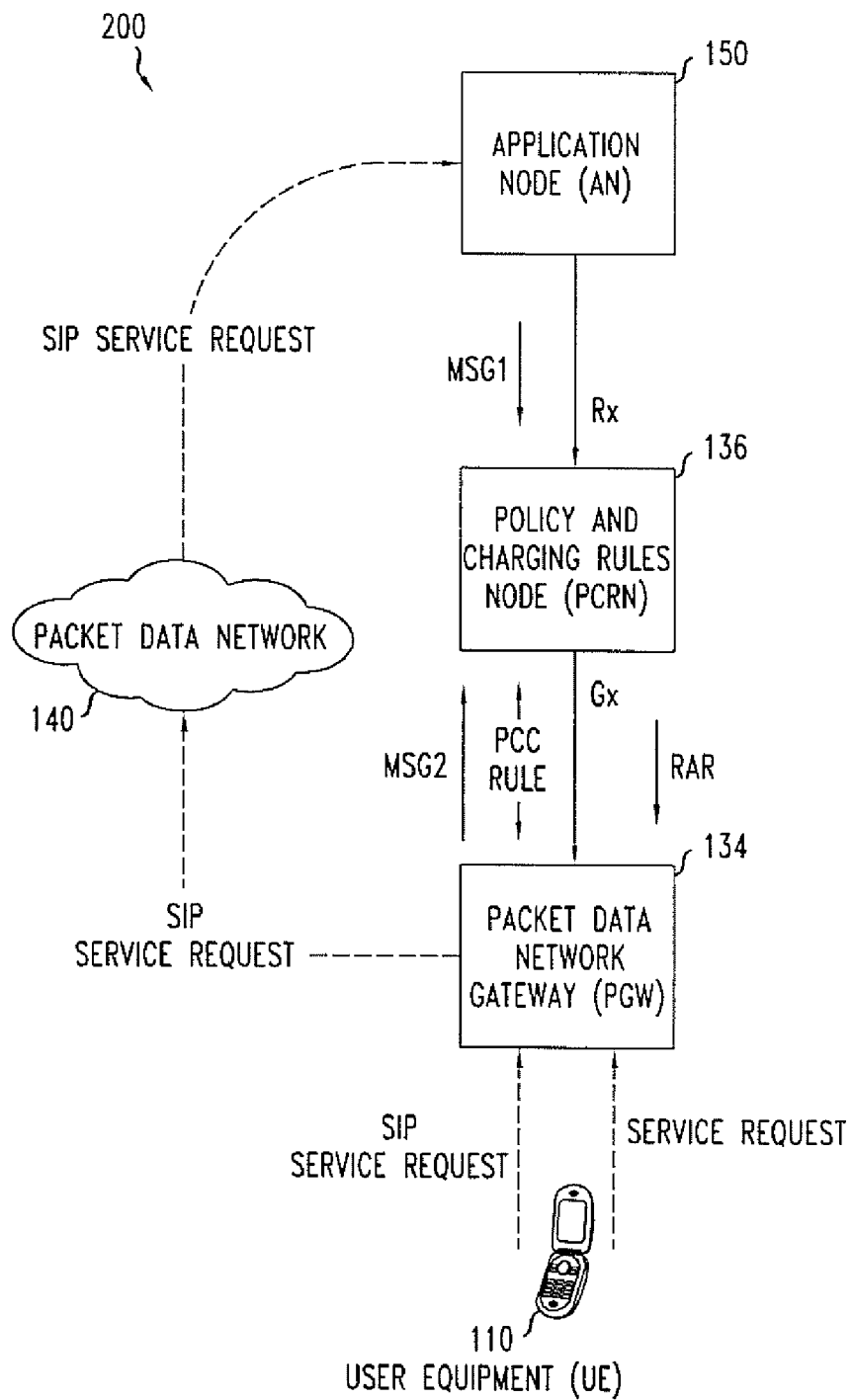
FIG. 2 illustrates an exemplary network for a PCRN receiving mate service requests.

FIG. 2 illustrates message passing in an exemplary communications network 200, with a PCRN receiving multiple messages for a service request. Network 200 includes AN 150, PCRN 136, PGW 134, UE 110, and packet data network 140. Network 200 may correspond to network 100.

In network 200, UE 110 may send multiple related service requests through multiple devices, such as AN 150 and PGW 134, with the request eventually being received by PCRN 136. PCRN 136 may then generate a PCC rule with the received information and other available information. PCRN 136 may then forward the PCC rule to PGW 134, which may transmit the PCC rule to other gateways, such as SGW 132.

UE 110 may send a session initiation protocol (SIP) service request that may be handled by application node (AN) 150. AN 150 may receive the service request through packet data network 140 and PGW 134. AN 150 may package the received service request into a message (MSG1) that may then be sent to the PCRN 136 via the Rx interface. Because MSG1 is a service request from AN 150, it may be called an AN message. The message sent by AN 150 may include information such as the required bandwidth and type of media. The message sent by AN 150 to the PCRN 136 may take precedence over other messages the PCRN 136 may receive from other components such that when PCRN 136 receives conflicting information from other components (e.g., PGW 134), the PCRN 136 may use the information included in the message sent from AN 150.

The message sent by the AN 150 may be in the form of an AA-Request command. The AA-Request command may include a plurality of information, including the IP address of UE 110 (for example, in a Forward-IP-Address AVP or Framed-IPv6-Prefix AVP) and service information (for example, in a Media-Component-Description AVP). The AA-Request may also include information indicating the particular service to which a session may belong (for example, in an AF-Application-Identifier AVP).

UE 110 may also send another service request related to the SIP service request previously sent to AN 150. The related service request may be sent through PGW 134 to PCRN 136, where the PGW 134 sends the service request in the form of a CC Request message. PGW 134 may include a PCEF, which may include a service request in a message (MSG2) sent to the PCRN 136. Because MSG2 is a service request from a PGW, it may be called a gateway request. The message sent from PGW 134 may be a mate message to the message sent from AN 150, as the PCRN 136 may use complementary information from both received messages when creating a PCC rule. The information included in the message sent from PGW 134 may include, for example, the required guaranteed bit rate. In various embodiments such as those using the PMIP standard, SGW 132 may also send service requests to PCRN 136 via the Gxx interface. Service requests from SGW 132 may also be called gateway requests.

Alternatively, UE 110 may not send a related service request through PGW 134. UE 110 may not send gateway requests for particular SIP service requests or may be generally disabled from sending gateway requests. For example, a subscriber may indicate that it wishes to prevent the UE 110 from making gateway requests. PCRN 136 may never receive a mate message for the message sent from AN 150. In this case, PCRN 136 may use information included in the message sent from AN 150, information stored at PCRN 136 or in other network locations, and local policy decisions when creating a PCC rule.

The PCRN 136 may receive multiple messages containing information and may use the information to generate a PCC rule. The PCRN 136 may use different procedures based on the initial message it receives. For example, if the application node 150 solicits a request for the provisioning of the PCC rule, the PCRN 136 may implement a PUSH procedure, as will be discussed further in relation to FIGS. 5A-5B, wherein the PCRN 136 provisions the PCC rule in a Re-Authorization Request (RAR) command to the PGW 134. Alternatively, when the request comes from the PCEF, as a CCR command for example, the PCRP 136 may implement a PULL procedure wherein PCRN 136 creates a PCC rule and includes the PCC rule in a CCA message in response to the CCR command.

Having described the components of subscriber network 100, 200 a brief summary of the operation of subscriber network 100, 200 will be provided. It should be apparent that the following description is intended to provide an overview of the operation of subscriber network 100, 200 and is therefore a simplification in some respects. The detailed operation of subscriber network 100, 200 will be described in further detail below in connection with FIGS. 3-5.

According to various exemplary embodiments, user equipment 110 may communicate with a plurality of devices, including the AN 150, SGW 132, or PGW 134 to indicate that user equipment 110 wishes to receive service. Such communication may occur via EPC 130 and packet data network 140 or via other communications channels (not shown). AN 110, SGW 132, or PGW 134 may then construct a message, including some of the subscriber and data flow information useful for providing the requested service. This information may be scattered across multiple devices, such as the AN 150, SGW 132, SPR 138, and the PGW 134. AN 150, SGW 132, SPR 138 or PGW 134 may then forward the generated message to the PCRN 136 through the appropriate interface. Upon receipt of the first message, PCRN 136 may determine whether it is likely to receive a mate message. PCRN 136 may use subscriber preferences stored in SPR 138 to determine whether UE 110 is allowed to send requests that would become mate messages. PCRN 136 may also store a history of requested services and an indication of whether PCRN 136 has previously received a mate message for the requested service. PCRN 136 may use this history to determine whether PCRN 136 is likely to receive a gateway message for the requested service.

If PCRN 136 determines that it is likely to receive a mate message, PCRN 136 may use a timer to wait for the mate message. In various embodiments, the timer may run for a fixed period of time, and the PCRN may wait for the timer to expire before taking any action on the first message. Alternatively, the timer may push the creation of the PCC rule to the end of an execution queue for the PCRN 136. For example, AN 150 may send a first message to the PCRN 136, which may then anticipate a second message from the PGW 134. The PCRN 136 may then place the generation of the PCC rule at the end of its execution queue, effectively waiting for the second message to arrive while executing other functions. When the PCRN 136 receives the second message before the timer expires, the PCRN 136 may immediately generate a PCC rule using information from both messages.

If PCRN 136 determines, however, that a mate message is unlikely to arrive, PCRN 136 may then immediately generate a PCC rule without using a timer to wait for the mate message. In various embodiments, PCRN 136 may disable the timer or stop the timer early when it determines that a mate message is unlikely to arrive. PCRN 136 may generate a PCC rule using the available information, which may include information from the first message, in addition to information from other sources, which may include, for example, information from existing PCC rules. PCRN 136 may also take subscriber data from SPR 138 and internally generated policy decisions into account when generating the PCC rule. PCRN 136 may then transmit the generated PCC rule to PGW 134 via the Gx interface for installation. After installation of the PCC rule, PGW 134 may then allow data communication for the requested data flow, while appropriately charging the subscriber and ensuring that a particular QoS is met.

Figures 3, 4:
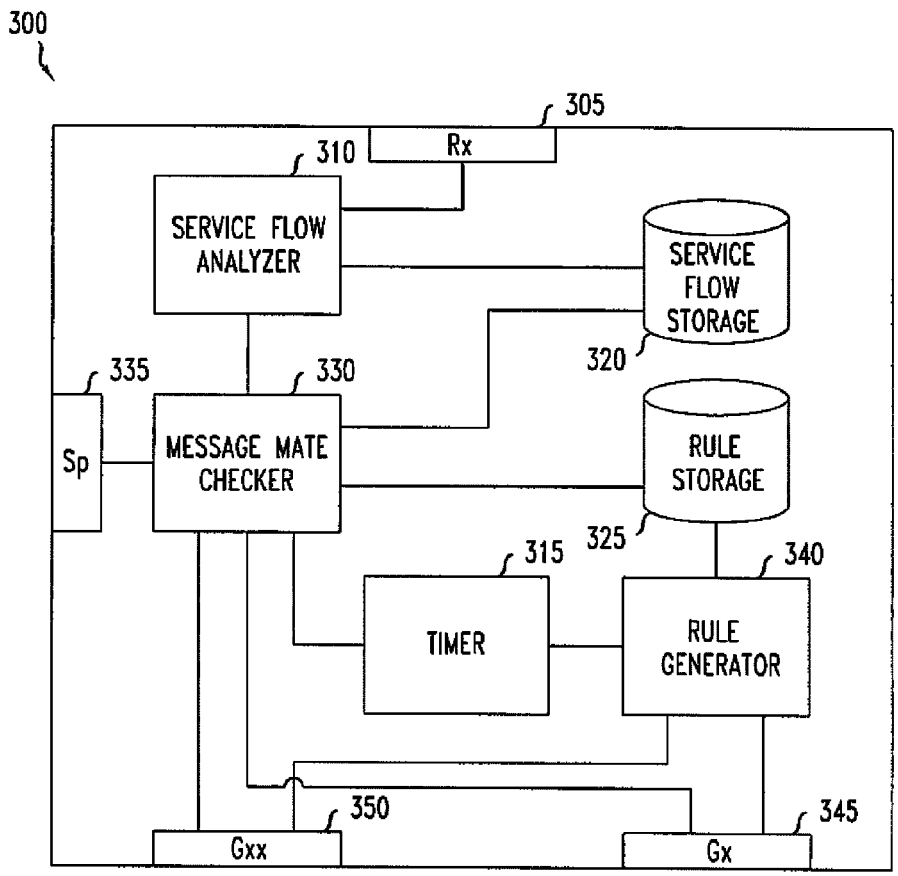
FIG. 3 illustrates an exemplary policy and charging rules node (PCRN) for creating new policy and charging control (PCC) rules in response to received service requests.
FIG. 4 illustrates an exemplary data arrangement for storing service flow information.

FIG. 3 illustrates an exemplary policy and charging rules node (PCRN) 300 for creating new policy and charging control (PCC) rules in response to at least one service request. PCRN 300 may correspond to PCRN 136 of the exemplary subscriber network 100, 200. PCRN 300 may include an Rx interface 305, service flow analyzer 310, timer 315, service flow storage 320, rule storage 325, message mate checker 330, Sp interface 335, rule generator 340, Gx interface 345 and Gxx interface 350.

Rx interface 305 may be an interface comprising hardware and/or executable instructions encoded on a machine-readable storage medium configured to communicate with an application function (AF) such as the AF included in AN 150. Such communication may be implemented according to the 3GPP TS 29.214. For example, Rx interface 305 may receive a service request in a message, such as an application request (AAR) from AN 150.

Service flow analyzer 310 may include hardware and/or executable instructions on a machine-readable storage medium configured to generate at least one service flow from a received request message. A service flow may include information described by the application message such as, for example, requested bandwidth, subscriber identifier, and/or data stream type. Service flow analyzer 310 may derive service flows from a hierarchy of components in a service request message. For example, an AN message received via the Rx interface 305 may consist of a plurality of Media Components (MC), with each Media Component containing a plurality of Media Sub-Components (MSC). Each Media Sub-Component may contain either one or more flow descriptions. The service flow may be a flattened representation of this hierarchy, matching the one or more flow descriptions with the corresponding Media Components and Media Sub-Components.

Timer 315 may include hardware and/or executable instructions on a machine-readable storage medium configured to measure a period of time where the PCRN 300 waits for a mate service request message to arrive after the PCRN 300 receives a first service request message. The timer 315 may measure a set time period for the PCRN 300 to explicitly wait to receive a second message. When the time period expires, timer 315 may signal PCRN 300 to generate a PCC rule using a PUSH procedure without receiving a mate message. In various alternative embodiments, timer 315 may trigger the PCRN 300 to delay the creation of a PCC rule by placing the priority of such creation further back in an execution queue. Timer 315 may "measure" a period by how far back in the execution queue it places the creation of the PCC rule. In such instances, the PCRN 300 passively "waits" for a period by executing other functions higher in its execution queue. When the PCC rule generation command occurs again in the execution queue, the PCRN 300 may again check to determine if the mate service request message has in fact arrived. If PCRN 300 determines that it is unlikely to receive a mate message, timer 315 may be disabled. Disabling the timer may include completely bypassing the operation of the timer, causing the timer to expire early, advancing the priority of creation in an execution queue or other methods of taking action without waiting for the timer to expire.

Service flow storage 320 may be any machine-readable medium capable of storing service flow decisions generated by the PCRN 300. Accordingly, rule storage 325 may include a machine-readable storage medium such as read-only memory (ROM), random-access memory (RAM), magnetic disk storage media, optical storage media, flash-memory devices, and/or similar storage media. As will be described further with regard to FIG. 4, service flow storage 325 may store decisions regarding whether PCRN 300 has waited for a UE initiated request message for a particular service flow. Service flow storage 320 may contain entries for each service flow requested at PCRN 136. Service flows may be identified by a combination of AN and subscriber IDs, by a unique service flow ID, or by an associated PCC rule ID. For example, service flow storage 320 may store an indication that PCRN 300 has previously used a push procedure or pull procedure to create PCC rules for a service between a particular AN and a particular subscriber. The former procedure may indicate that the PCRN did not wait for a gateway request message, while the later may indicate that the PCRN received a gateway request message.

Rule storage 325 may be any machine-readable medium capable of storing PCC rules generated by the PCRN 300. Accordingly, rule storage 325 may include a machine-readable storage medium such as read-only memory (ROM), random-access memory (RAM), magnetic disk storage media, optical storage media, flash-memory devices, and/or similar storage media. Rule storage 325 may store definitions of numerous PCC rules created by PCRN 300. Such definitions may include, for example, rule names, service data flow filters, QoS parameters, and charging parameters.

Message mate checker 330 may include hardware and/or executable instructions on a machine-readable storage medium configured to receive messages from a plurality of interfaces and determine if the messages are mates. UE 110 may request services through a plurality of devices that forward service requests to PCRN 300. These service requests may include a plurality of information, including, for example, an indication as to whether the originating device is expecting a complementary message. Other information stored in the system such as, for example, in service flow storage 320, rule storage 325 and SPR 138 may also be used to determine whether PCRN 136 is expecting a complementary message. Based on such information, message mate checker 330 may determine whether PCRN 300 is likely to receive a mate message. Message mate checker 330 may determine whether PCRN 300 should start a timer to wait to receive the mate message based on whether PCRN 300 is likely to receive a mate message. As will be discussed in further detail below in relation to FIGS. 5a and 5b, message mate checker 330 may check a plurality of markers or flags to determine if a mate message should be expected. Message mate checker 300 may also determine whether the PCRN 300 is still waiting for a mate message for a previous request message.

Sp interface 335 may be an interface comprising hardware and/or executable instructions encoded on a machine-readable storage medium configured to communicate with an SPR such as SPR 138. Sp interface 335 may transmit record requests and receive subscription profile records. Subscription profile records may include subscriber service preferences indicating the types of services for which the UE is allowed to initiate requests. For example, services may be divided into known services and unknown services. Known services may be those for which the PCRN 300 will receive an AF request. Unknown services may be those for which the PCRN 300 will not receive an AF request. Subscription profile records may indicate subscriber service preferences with a flag for each type of service indicating whether the UE is allowed to request that type of service.

Rule generator 340 may include hardware and/or executable instructions on a machine-readable storage medium configured to generate a new PCC rule based on information included in, for example, service request messages. Rule generator 340 may first generate a new PCC rule object from the information received by the PCRN 300. Next, rule generator 340 may generate and store a PCC rule name for the new PCC rule. The PCC rule name may be generated according to any method known to those of skill in the art such as, for example, incrementing a previously assigned rule name or generating a random name. Rule generator 340 may also insert other data into the PCC rule such as, for example, BCMO, WANR and WGR markers used to indicate the rule creation status. At this point, the new PCC rule may be a valid rule ready for installation or may require further modification.

Gx interface 345 may be an interface comprising hardware and/or executable instructions encoded on a machine-readable storage medium configured to communicate with a PGW such as PGW 134. Such communication may be implemented according to the 3GPP TS 29.212. Thus, Gx interface 345 may receive requests for PCC rules and transmit PCC rules for installation.

Gxx interface 350 may be an interface comprising hardware and/or executable instructions encoded on a machine-readable storage medium configured to communicate with a SGW such as SGW 132. Such communication may be implemented according to the 3GPP TS 29.212. Thus, Gxx interface 350 may receive requests for QoS rules and transmit QoS rules for installation.

FIG. 4 illustrates an exemplary data arrangement 400 for storing service flow information. Data arrangement 400 may be, for example, a table in a database stored in service flow storage 320. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include an Application ID field 405, a Subscriber ID field 410, a PCC Rule field 415, a service flow ID field 420, and a creation method field 425. Data arrangement 400 may include additional fields (not shown) required or useful in defining service flows. Data arrangement 400 may include multiple entries such as, for example, entries 430, 435 and 440.

Application ID field 405 may be used to identify an application node providing a service. For example, the value of the AF-Application-Identifier AVP in an AAR message may be used to identify an application. Subscriber ID field 410 may be used to identify the subscriber or UE receiving the service. The subscriber ID may be the same subscriber ID used in SPR 138. PCC rule field 415 may identify a PCC rule created for a service flow using a PCC rule name. The PCC rule name may be the name generated by rule generator 340. The PCC rule name may be used to reference Rule Storage 325. Service flow ID field 420 may contain a unique identifier for each service flow. The service flow ID may be assigned by service flow analyzer 310. Creation method field 425 may indicate a method used to create a PCC rule for the service flow.

As an example of a possible entry in data arrangement 400, record 430 may indicate a service flow between an application node identified as "0x386B" and a subscriber identified as "10000000000001." The service flow resulted in a PCC rule "0xA782" and may have a unique identifier of "0xB382." PCRN 136 generated the PCC rule using the PUSH procedure, meaning that PCRN 136 did not receive a gateway request.

As a further example, record 435 may indicate a service flow between an application node identified as "0x7903" and a subscriber identified as "10000000000002." The service flow resulted in a PCC rule "0x8267" and may have a unique identifier of "0xA391." PCRN 136 generated the PCC rule using the PULL procedure, meaning that PCRN 136 received a gateway request. Record 440 may indicate that data arrangement 400 may include additional entries representing service flows.

Figure 5A:
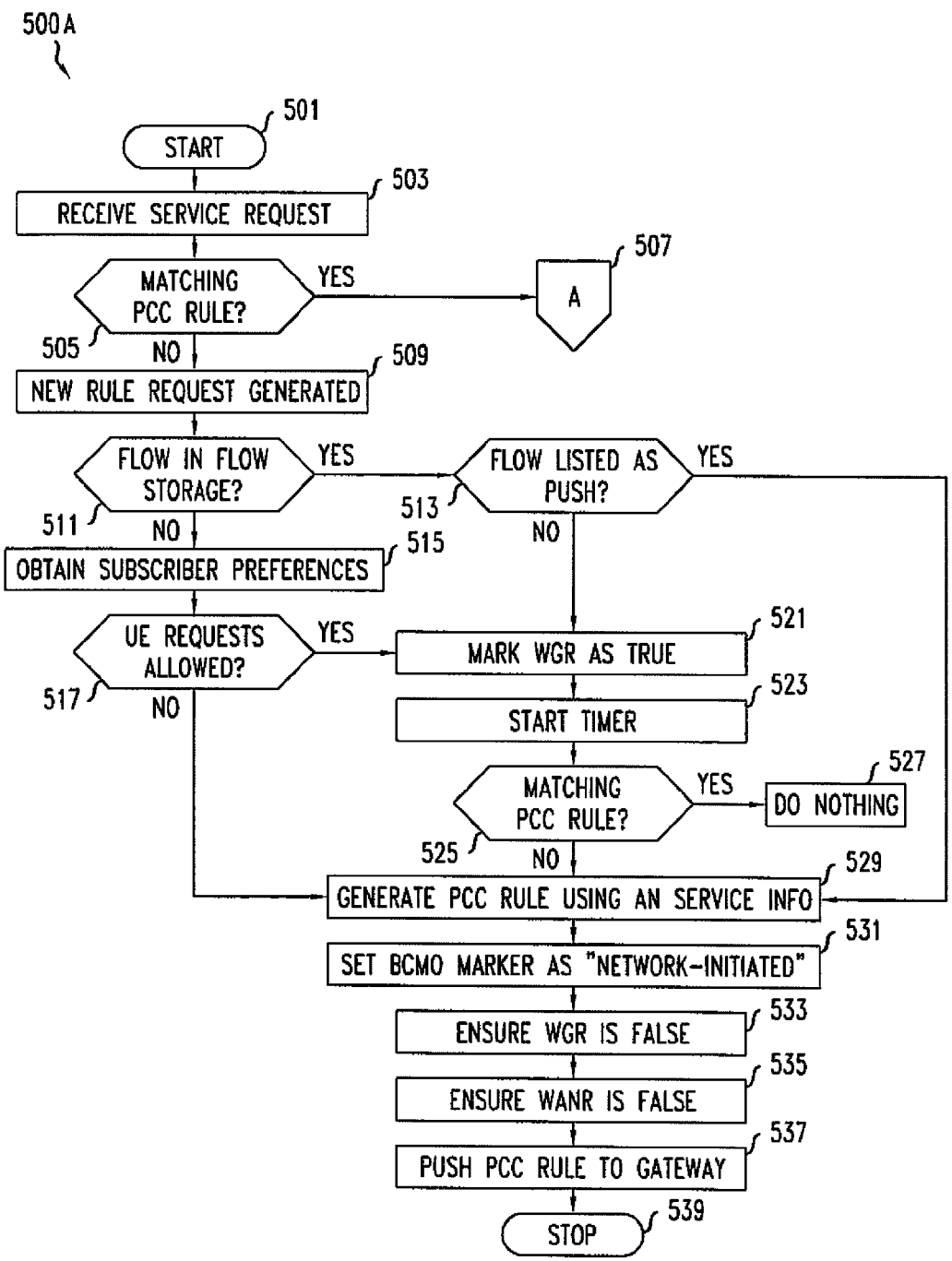
FIG. 5A illustrates an exemplary method for generating a PCC rule when receiving a message from an application node (AN)
Figure 5B:
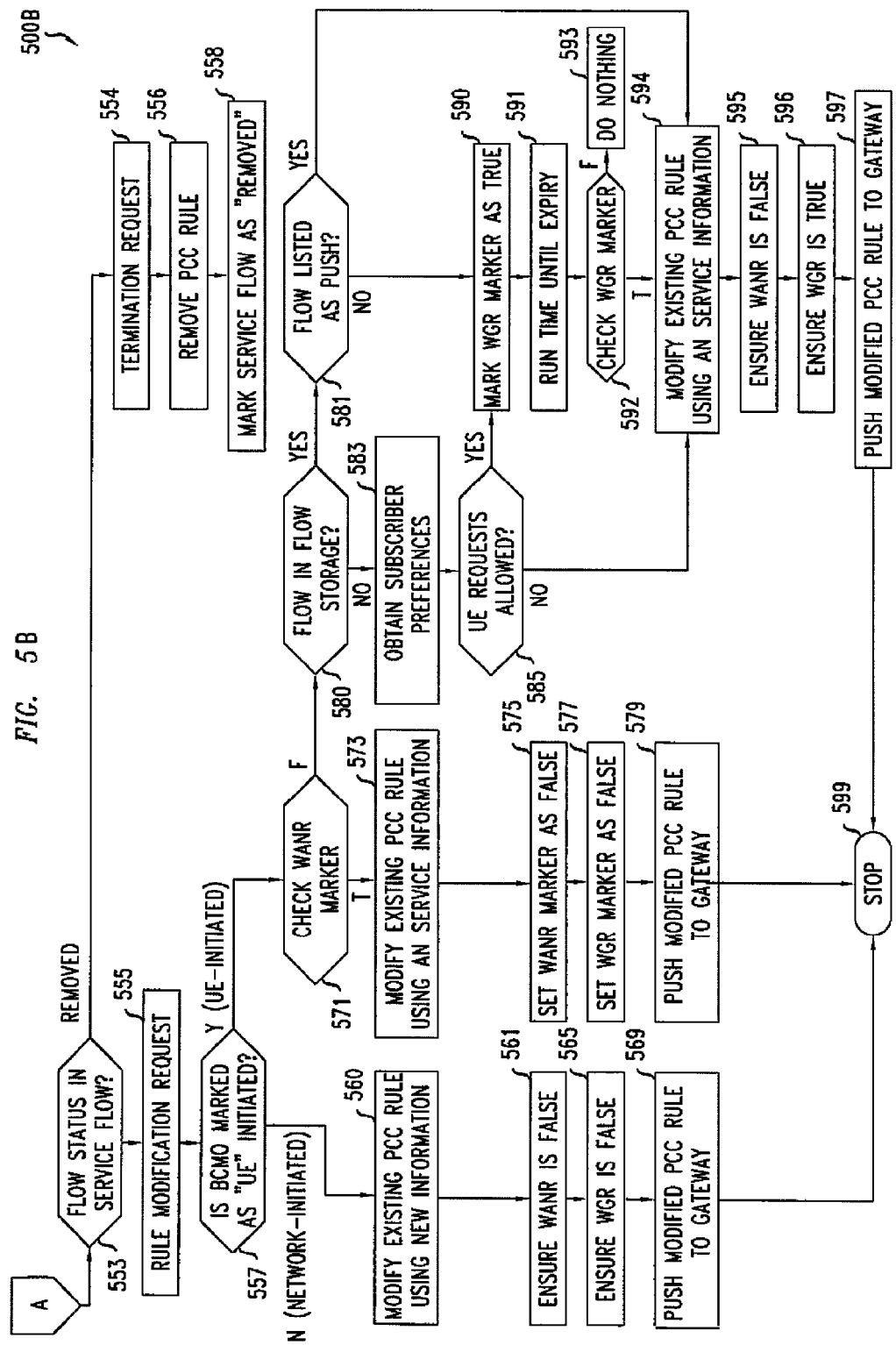
FIG. 5B further illustrates an exemplary method for generating a PCC rule when receiving a message from an application node.

FIGS. 5A-5B illustrate an exemplary method 500 for creating a new policy and charging control (PCC) rule in response to a service request from AN 150. Method 500 may be performed by the components of EPC 130 and/or PCRN 136, 300 to establish PCC rules for service data flows identified by at least the service request from AN 150.

Method 500 may begin at step 501 and proceed to step 503, where PCRN 136 may receive a service request message from AN 150 via the Rx interface. Service flow analyzer 310 may derive service flows from various components of the service request message. For example, service flow analyzer 310 may derive a service flow from the Media-Component AVP of an AN message. Each service flow may map to a distinct PCC rule that may be installed in the gateways SGW 132 or PGW 134 or stored in rule storage 325. Accordingly, the PCC rule may contain a reference to the service flow used in its creation.

Method 500 may then proceed to step 505, where message mate checker 330 inside PCRN 136 may determine whether a PCC rule exists in rule storage 325 that matches the received service flow. In various exemplary embodiments, if there is a matching PCC rule, method 500 may proceed to step 551 of method 500b, which will be discussed in further detail below in relation to FIG. 5B. In various alternative embodiments, if there is a matching PCC rule, PCRN 136 may always push a modified PCC rule without waiting. If there is no matching PCC rule, this may indicate that the message from AN 150 initiated the request for a PCC rule, so the method may proceed to step 509, where service flow analyzer 310 may generate a new PCC rule request for the service flow. In various embodiments, service flow analyzer 310 may signal timer 315 to start when it generates a new PCC rule request.

In step 511, message mate checker 330 may begin determining whether PCRN 300 should wait for a mate message. Message mate checker may determine whether service flow storage 320 contains an entry for the requested service flow. If service flow storage 320 contains an entry for the requested service flow, this may indicate that PCRN 300 has previously handled a request for the same service flow, so the method may proceed to step 513. If service flow storage 320 does not contain an entry for the requested service flow, this may indicate that PCRN 300 has never handled a request for the same service flow, so the method may proceed to step 515. In various embodiments, method 500 may proceed to step 515 without checking a service flow storage to determine whether PCRN 136 has previously handled a request for the same service flow.

In step 513, message mate checker 330 may determine whether PCRN 300 should wait for a mate message based on previous decisions. If the entry in service flow storage 320 for the requested service flow indicates that PCRN 300 has previously received a gateway message for that service flow, this may indicate that PCRN 300 is likely to receive a gateway message for the current request. Therefore, message mate checker 330 may determine that PCRN 300 should wait for a gateway request for the currently requested service flow. The method may then proceed to step 521. Alternatively, if the entry in service flow storage 320 indicates that PCRN 300 has previously pushed a PCC rule for the requested service flow without waiting, message mate checker 330 may determine that PCRN 300 should not wait for a gateway service request. The method may then proceed directly to step 529. Alternatively, message mate checker 330 may disable the timer 315 if it determines that PCRN 300 should not wait for a gateway request.

In step 515, Sp interface 335 may obtain subscriber service preferences from a subscriber profile repository 138. The subscriber service preferences may indicate when the UE is allowed to initiate requests for service flows. In various embodiments, services are divided into known services and unknown services. The subscriber service preferences may be indicated with a flag for whether gateway service requests are allowed for each type of service. Alternatively, the subscriber profile registry may contain a list of individual services for which the UE is allowed to initiate service requests or a list of individual services for which the UE is not allowed to initiate service requests. In various embodiments, the subscriber service preferences may also indicate whether the PCRN 136 may reduce latency by disabling the timer 315.

In step 517, message mate checker 330 may determine whether gateway requests are allowed for the requested service based on the subscriber service preferences. For example, if the subscriber service preferences do not allow gateway requests for either known services or unknown services, message mate checker 330 may determine that gateway requests for services are not allowed regardless of the service type. As another example, the subscriber service preferences may list the particular service requested by the received message in a list of allowed services, so message mate checker 330 may determine that gateway requests are allowed. If gateway requests are allowed, the method may proceed to step 521. If gateway requests are not allowed, the method may proceed directly to step 529.

In step 521, rule generator 340 may generate a base PCC rule, which includes a Waiting for Gateway Request (WGR) marker. The WGR marker included in the PCC rule may be a Boolean value that indicates that the service flow is still waiting for a mate gateway request to be received by the PCRN 136. Generation of the base PCC rule may also include, for example, generating a PCC rule name, service data flow filter, and initial QoS bandwidth parameters. During this step, the PCRN 136 may mark the WGR marker as "true," which indicates that the service flow is waiting for a mate gateway request to be received. In step 523, the PCRN 136 may start a timer to wait to receive the mate message from the PGW 134. Alternatively, the timer may have started previously. In either case, PCRN 136 may wait for the timer to expire. PCRN 136 may wait for the mate message because the mate message may contain information complementary to the message received in the service flow.

The PCRN 136 may wait until the timer expires, the timer is disabled, or the mate gateway request arrives. Method 500 may then proceed to step 525, where the PCRN 136 determines whether rule storage 325 now contains a matching PCC rule. If rule storage 325 does contain a matching PCC rule, this may indicate that the gateway request arrived while the timer was still active. In this case, method 500 may proceed to step 527, wherein the PCRN 136 may perform no further operations, as the PCC rule was created when the gateway request arrived and contains the relevant information from both the service flow and from flow information in the gateway request. If, however, there is no matching PCC rule, this may indicate that the mate gateway request did not arrive by the time the PCRN's timer expired. In this instance, method 500 proceeds to step 529.

In step 529, the rule generator 340 creates a PCC rule using the service flow information from AN 150. This may be the first PCC rule, as it may still wait for a mate gateway request. The PCRN 136 may indicate such status in step 531, where the PCRN 136 sets a Bearer Control Mode Operation (BCMO) marker as "Network-initiated," which indicates that the PCC rule was created as a result of only service requests from AN 150. If the BCMO marker is set as "UE-initiated," this may indicate that the PCC rule was created as a result of a service request from the UE 110 through PGW 134 or a service request from AN 150.

In step 533, the PCRN 136 may first ensure that the service flow is not waiting for an AN request by checking the value of the WGR marker. If the WGR marker is set as false, the PCRN 136 may refrain from changing the value of the WGR marker. Alternatively, if the WGR marker is set as true, the PCRN 136 may change the value of the WGR marker to false. This may ensure the PCRN 136 does not accidently wait for a mate message that has already arrived or a mate message that message mate checker 330 has determined will not arrive.

In step 535, the PCRN 136 may first ensure that the Waiting for Application Node Request (WANR) marker in the PCC rule is set to false by checking the value of the WANR marker. If the marker is false, the PCRN 136 may refrain from changing the value of the WANR marker. Alternatively, if the WANR marker is set as true, the PCRN 136 may change the value of the WGR marker to false. The method may then proceed to step 537, where the PCRN 136 may push the PCC rule to PGW 134. PCRN 136 may also update service flow storage 320 to indicate that PCRN 136 has pushed a PCC rule for the requested service flow. This may indicate that PCRN 136 should not wait for a gateway request the next time it receives a request for that service flow.

Method 500b is a continuation of method 500a and may illustrate the actions of the PCRN 136 when the there is a matching PCC rule stored in rule storage 325 for the received service flow request. Method 500b may begin in step 553, wherein the service flow analyzer 310 determines whether the flow status in the service flow request is removed. When the flow status in the service flow is removed, method 550 may proceed to step 554, where the PCRN 136 may determine that the service request is a termination request. Following the termination request, in step 556, the PCRN 136 may remove the PCC rule that matched the received service flow. In step 558, the PCRN 136 may mark the service flow as "removed," creating no new PCC rule and taking no further action on the received service flow.

If, however, the service flow is not marked as removed, method 550 may proceed to step 555, where the PCRN 136 may determine that the service request is a rule modification request, indicating that the PCC rule that matched the received service flow may be modified with at least the information included in the received service flow. Next, in step 557, the PCRN checks the BCMO marker included in the PCC rule. If the BCMO marker indicates that the PCC rule is Network-initiated, then method 550 may proceed to step 560. However, if the rule is marked as UE-initiated, method 550 may proceed to step 571.

In step 560, the PCRN 136 may update the matching previously generated PCC rule with the newly received information from the AN 150 such as, for example, updated flow information. The PCRN 136 may update the PCC rule without waiting for any mate message because the existing rule was created with only information from the AN. This update may involve modifying the existing PCC rule stored in rule storage 325 to reflect the new information received from the AN 150.

Steps 561 and 565 may be similar to steps 533 and 535, where the PCRN 136 may ensure that the new PCC rule is not waiting for an AN request by checking whether the WANR marker is set as false, and then may ensure that the WGR is marked as not waiting for a mate gateway request. Method 550 may then proceed to step 569, where the PCRN 136 may remove the previous PCC rule and pushed the newly-created PCC rule to the PCEF in PGW 134, which may forward the updated PCC rule to other gateways.

Returning to step 557, if the BCMO of the PCC rule is marked as UE-initiated, method 550 may proceed to step 571, where the PCRN may check the WANR marker of the PCC to determine whether the PCC rule is waiting for a mate AN request. If the WANR marker is set as true, PCRN 300 may have previously received a gateway request, and the PCC rule is waiting for an AN request, which may indicate that the received service request is the anticipated mate AN request and has already arrived.

If PCRN 300 has received both a gateway request and AN request, method 550 may then proceed to step 573, where the rule generator 340 may create a new PCC rule by modifying the existing PCC rule using the information in the recently received AN request, the previously received gateway request and the information in the existing PCC rule. After generating the new PCC rule, the method 550 may proceed to steps 575 and 577, where the PCRN 136 may mark both the corresponding WANR and WGR markers as false to indicate that the PCC rule and service flows are no longer waiting for a mate request to be received by the PCRN 136. In step 579, which corresponds to step 569, the PCRN 136 may push the new PCC rule to the PCEF in PGW 134, which may send the new PCC rules to other gateways.

Returning to step 571, if the WANR marker is set as false, this may indicate that the PCC rule is not waiting for an AN request, which may in turn indicate that the received request is not an anticipated mate gateway request. Accordingly, method 550 may proceed to step 580, where the message mate checker 330 determines whether PCRN 300 should wait for a gateway service request. In various embodiments, timer 315 may start before message mate checker 330 determines whether PCRN 300 should wait for a gateway service request. Step 580 may be similar to step 511. If the service flow storage 320 contains an entry for the requested service flow, the method may proceed to step 581. Otherwise, the method may proceed to step 583.

In step 581, message mate checker 330 may determine whether PCRN 136 should wait for a gateway service request based on previous determinations. Thus, step 581 may be similar to step 513. If service flow storage 320 indicates that PCRN 136 previously received a gateway service request for the requested service flow, PCRN 136 may determine that it should wait for a gateway service request and proceed to step 590. If service flow storage 320 indicates that PCRN 136 previously pushed a PCC rule without waiting for a gateway service request, PCRN 136 may determine that it should not wait for a gateway service request and may proceed directly to step 594.

Returning to step 580, the method may proceed to step 583 if service flow storage 320 does not contain an entry for the requested service flow. Step 583 may be similar to step 515. Sp interface 335 may receive subscriber service preferences from subscription profile repository 138. The method may then proceed to step 585, which may be similar to step 517. If message mate checker 330 determines that a UE request is allowed, the method may proceed to step 590. Otherwise, the method may proceed directly to step 594.

In step 590, PCRN 136 may mark the WGR marker in the corresponding service flow as true, which may indicate that the service flow is waiting for a mate gateway request. Afterwards, method 500b proceeds to step 591, where the PCRN 136 may start a timer to wait for the mate gateway request.

In step 592, method 500b may determine whether the WGR marker is set as true. The WGR marker may be set to false whenever the mate gateway request is received by the PCRN 136 via the Gx interface 345. Such a receipt by the PCRN 136 may occur before the timer expires. When the WGR marker is set as false, this may indicate that the gateway request arrived before the timer expired, and the PCRN 136 has already generated a PCC rule. In this case, method 550 may proceeds to step 593, where the PCRN 136 may take no further action. Otherwise, if at step 592, the WGR request is set as true, the service flow may still be waiting for a mate gateway request and method 550 may proceed to step 594.

In step 594, the PCRN 136 may modify the existing PCC rule with the information in the received service flow. The newly-modified PCC rule may thus be similar to the previously-generated PCC rule except for the changes in the information included in the requested service flows. In step 595, which corresponds to 561, the PCRN 136 may ensure that the WANR marker in the new PCC rule is set as false. In step 596, the PCRN 136 may ensure that the WGR marker in the received service flow is also set as true, as the PCRN 136 may not have received flow information from the PGW 134 and may have been generated with partial information. Afterwards, at step 597, the PCRN 136 may forward the new PCC rule to the PCEF in PGW 134, which may, in turn, forward the existing PCC rule to other gateways.

Having described exemplary components and methods for the operation of exemplary subscriber network 100 and PCRN 300, an example of the operation of exemplary network 100 and PCRN 300 will now be provided with reference to FIGS. 1-4. PCRN 136 may correspond to PCRN 300. The contents of service flow storage 320 may be represented by data arrangement 400.

The process may begin when PCRN 136, 300 receives MSG1 from AN 150 via Rx interface 305 requesting a new service flow to subscriber 100000000000003. Service flow analyzer 310 may extract a requested service flow from MSG1 and pass it to message mate checker 330. Message mate checker 330 may then check rule storage 325 to determine whether there is a matching PCC rule for the service flow. Assuming this is a new service, there may be no matching PCC rule in rule storage 325, so message mate checker may generate a new rule request.

Message mate checker 330 may then determine whether PCRN 300 should use timer 315 to wait for a mate message before generating a PCC rule. Message mate checker 330 may check service flow storage 320 to determine whether PCRN 300 has previously generated a PCC rule for the service flow. Data arrangement 400 may not include any entries for service flows between AN 150 and subscriber 100000000000003, so message mate checker 330 may obtain subscriber preferences from SPR 138. The subscriber preferences may indicate that subscriber 100000000000003 does not allow gateway requests for either known or unknown services, so message mate checker 330 may determine that PCRN 300 should not wait for a gateway request. Rule generator 340 may then generate a new PCC rule for the service flow. Rule generator 340 may set the BCMO marker as "Network-Initiated" because the rule contains no information from a gateway request. Rule generator 340 may also set WGR and WANR flags to false. Rule generator 340 may then push the new PCC rule to PGW 134 via Gx interface 345. Rule generator 340 may also add the new PCC rule to rule storage 325 and add the service flow information to service flow storage 320. A second example will now be provided to illustrate receipt of a message to update an existing PCC rule. The message may, for example, request an upgrade to the maximum bandwidth of a service flow with service flow ID 0xB382. As in the previous example, PCRN 300 may receive a message from AN 150 via Rx interface 305. Service flow analyzer 310 may generate a requested service flow from the message. Message mate checker 330 may check rule storage 325 and determine that there is an existing PCC rule. Service flow analyzer 310 may then check the flow status of the requested service flow to determine that the message is not a termination request. Message mate checker 330 may then check the BCMO marker of the PCC rule in rule storage 325. If the PCC rule is marked as NW-initiated, message mate checker 330 may pass the request to rule generator 340 to modify the existing PCC rule without waiting because the PCC rule contains no gateway request information. If the PCC rule is marked as UE-initiated, message mate checker 330 may check the WANR marker to determine whether PCRN 300 has already received a gateway request, in which case rule generator 340 may modify the PCC rule without waiting.

If PCRN 300 is not waiting for an AN request, service flow analyzer 310 may check flow storage 320 to determine whether to use timer 315 to wait for a gateway request. Data arrangement 400 contains an entry for service flow 0xB382 indicating that PCRN 300 has previously generated a PCC rule for the service flow using the push procedure, so rule generator 340 may immediately generate a new PCC rule using the service flow information contained in the AN request without using timer 315 to wait for a gateway request.

According to the foregoing, various exemplary embodiments provide for dynamic creation of policy and charging control rules in response to service requests from application functions. Particularly, by determining whether the PCRN will receive a matching gateway service request, the PCRN may decrease PCC rule instantiation latency by immediately pushing PCC rules when no mate message is expected or likely to arrive. By bypassing or disabling the timer when no mate message is expected or likely to arrive, the method reduces the time spent idly waiting for a message to arrive. This helps the PCRN to process other requests faster and reduce latency for all requests.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Policy and Charging Rules Node (PCRN) for processing a first service request message from an application node to generate at least one Policy and Charging Control (PCC) rule, the method comprising:
   receiving at the PCRN from an application node the first service request message requesting a service flow for a subscriber;
   determining whether the PCRN should wait for a mate message for the service flow;
   if the PCRN should not wait for a mate message:
      generating at least one PCC rule based on the information received in the first service request message received by the PCRN, and
      pushing the at least one PCC rule to at least one gateway; and
   if the PCRN should wait for a mate message:
      using a timer to wait for a period of time for the PCRN to receive a mate message from a second device before generating a first PCC rule, and
      generating at least one PCC rule based on the information received in at least one of the first service request message and the mate message.

2. The method of claim 1 wherein the step of determining whether the PCRN should wait for a mate message comprises determining whether gateway requests are allowed for the subscriber.

3. The method of claim 2 wherein the step of determining whether gateway requests are allowed for the subscriber comprises:
obtaining subscriber service preferences from a subscriber profile repository, the subscriber service preferences comprising: a known services flag and an unknown services flag; and
if the known services flag is set to false and the unknown services flag is set to false, determining that gateway requests are not allowed for the subscriber.

4. The method of claim 1 further comprising:
storing for the service an indication of whether the PCRN received a gateway request for the service.

5. The method of claim 4 wherein the step of determining whether the PCRN should wait for a mate message comprises:
determining whether the PCRN has previously received a gateway request for the service; and
if the PCRN has previously received a gateway request for the service, determining that the PCRN should wait for a mate message.

6. The method of claim 1 further comprising storing for the service an indication of whether the PCRN pushed a PCC rule.

7. The method of claim 6, wherein the step of determining whether the PCRN should wait for a mate message comprises:
determining whether the PCRN has previously pushed a PCC rule for the service; and
if the PCRN has previously pushed a PCC rule for the service, determining that the PCRN should not wait for a mate message.

8. A Policy and Charging Rules Node (PCRN) for processing at least a first request message to generate at least one Policy and Charging Control (PCC) rule, the PCRN comprising:
a first interface that receives a first request message from an application node;
a service flow analyzer that generates at least one service flow from the first request message;
a second interface that may receive a second request message from a gateway, the second request message being a mate message to the first request message and containing flow information complementary to the at least one service flow;
a message mate checker that determines whether the PCRN is likely to receive the second request message when the PCRN receives the first request message;
a timer that measures a period of time to receive the second message if the mate checker determines that the PCRN is likely to receive the second request message; and
a rule generator that creates the at least one PCC rule for the service flow using at least one of the first and second messages.

9. The PCRN of claim 8, further comprising:
an Sp interface that receives subscriber service preferences from a subscriber profile repository, wherein the mate checker determines whether the PCRN is likely to receive a mate message based on the subscriber service preferences.

10. The PCRN of claim 9, wherein the subscriber service preferences comprise:
a known services flag; and
an unknown services flag.

11. The PCRN of claim 9, wherein the subscriber service preferences may be configured via a web-portal.

12. The PCRN of claim 8, further comprising:
a service flow storage that stores for each service flow an indication of whether the PCRN has received a gateway request, wherein the mate checker determines whether the PCRN is likely to receive a mate message based on the contents of the service flow storage.

13. The PCRN of claim 8 wherein if the message mate checker determines that the PCRN is not likely to receive a mate message, the message mate checker disables the timer.

14. The PCRN of claim 8, further comprising a rules storage that stores a copy of PCC rules created by the rule generator, wherein the mate checker determines whether the PCRN is waiting for a mate message based on the contents of the rule storage.

15. A non-transitory machine-readable storage medium encoded with instructions for a policy and rules charging node (PCRN) to generate at least one Policy and Charging Control (PCC) rule, the non-transitory machine-readable storage medium comprising:
instructions for receiving at the PCRN from an application node a first service request message requesting a service flow for a subscriber;
instructions for determining whether the PCRN should wait for a mate message for the service flow;
instructions for generating at least one PCC rule based on the information received in the first service request message received by the PCRN and pushing the first PCC rule to at least one gateway if the PCRN should not wait for a mate message; and
instructions for using a timer to wait for period of time for the PCRN to receive a mate message from a second device before generating a first PCC rule and generating at least one PCC rule based on the information received in at least one of: the first service request message and the mate message if the PCRN should wait for a mate message.

16. The non-transitory machine-readable storage medium of claim 15 wherein the instructions for determining whether the PCRN should wait for a mate message comprise instructions for determining whether gateway requests are allowed for the subscriber.

17. The non-transitory machine-readable storage medium claim 16 wherein the step of determining whether gateway requests are allowed for the subscriber comprises:
instructions for obtaining subscriber service preferences from a subscriber profile repository, the subscriber service preferences comprising: a known services flag and an unknown services flag; and
instructions for determining that gateway requests are not allowed for the subscriber if the known services flag is set to false and the unknown services flag is set to false.

18. The non-transitory machine-readable storage medium of claim 15 further comprising:
instructions for storing for the service an indication of whether the PCRN received a gateway request for the service.

19. The non-transitory machine readable storage medium of claim 18 wherein the instructions for determining whether the PCRN should wait for a mate message comprise:
instructions for determining whether the PCRN has previously received a gateway request for the service; and
instructions for determining that the PCRN should wait for a mate message if the PCRN has previously received a gateway request for the service.

20. The non-transitory machine-readable storage medium of claim 15 further comprising:
  instructions for storing for the service an indication of whether the PCRN pushed a PCC rule.

21. The non-transitory machine-readable storage medium of claim 20, wherein the step of determining whether the PCRN should wait for a mate message comprises:
  instructions for determining whether the PCRN has previously pushed a PCC rule for the service; and
  instructions for determining that the PCRN should not wait for a mate message if the PCRN has previously pushed a PCC rule for the service.

* * * * *